(12) United States Patent
Fox

(10) Patent No.: US 7,297,086 B2
(45) Date of Patent: Nov. 20, 2007

(54) EPICYCLIC GEAR SYSTEMS

(75) Inventor: Gerald P. Fox, Massillon, OH (US)

(73) Assignee: The Timken Company, Canton, OH (US)

( * ) Notice: Subject to any disclaimer, the term of this patent is extended or adjusted under 35 U.S.C. 154(b) by 206 days.

(21) Appl. No.: 10/543,213

(22) PCT Filed: Jan. 27, 2004

(86) PCT No.: PCT/US2004/002157

§ 371 (c)(1),
(2), (4) Date: Jul. 22, 2005

(87) PCT Pub. No.: WO2004/067998

PCT Pub. Date: Aug. 12, 2004

(65) Prior Publication Data

US 2006/0142114 A1    Jun. 29, 2006

Related U.S. Application Data

(60) Provisional application No. 60/442,883, filed on Jan. 27, 2003.

(51) Int. Cl.
F16H 1/48 (2006.01)
(52) U.S. Cl. .................. 475/331; 475/346; 475/348
(58) Field of Classification Search ................ 475/331, 475/338, 346, 348
See application file for complete search history.

(56) References Cited

U.S. PATENT DOCUMENTS

| 3,303,713 | A | | 2/1967 | Hicks |
| 3,402,622 | A | * | 9/1968 | Matut Archanco .......... 475/338 |
| 5,716,300 | A | * | 2/1998 | Sammataro et al. ........ 475/346 |
| 2003/0008748 | A1 | | 1/2003 | Fox |
| 2003/0123984 | A1 | | 7/2003 | Wilde et al. |
| 2003/0232692 | A1 | * | 12/2003 | Chen .......................... 475/331 |
| 2004/0038770 | A1 | * | 2/2004 | Flamang et al. ............ 475/348 |
| 2004/0105753 | A1 | * | 6/2004 | Christensen ................ 415/4.1 |

OTHER PUBLICATIONS

ESTU-R-95 Report, "The 3MW Wind Turbine Project on Orkney", 1981-1995, L A W Bedford et al, Edited by Dr. D. I. Page, Jan. 1996.

* cited by examiner

*Primary Examiner*—Sherry Estremsky
*Assistant Examiner*—Edwin A Young
(74) *Attorney, Agent, or Firm*—Polster, Lieder, Woodruff & Lucchesi, L.C.

(57) ABSTRACT

An epicyclic gear system (A, B), which is highly compact, yet capable of transferring substantial torque, includes a sun gear (2, 62), a ring gear (4, 64) around the sun gear, and planet gears (6, 8, 66, 68) organized in two rows between the sun and ring gears. In addition, the gear system has a carrier (10, 70) provided with one or two flanges (14, 72, 74) and flexible pins (20, 22, 80, 82) around which the planet gears revolve. The planet gears are mounted on the pins in a double cantilever arrangement to improve the mesh with the sun and ring gears and achieve better load distribution.

19 Claims, 4 Drawing Sheets

EPICYCLIC GEAR SYSTEMS

CROSS REFERENCE TO RELATED APPLICATIONS

This application derives and claims priority from U.S. provisional application 60/442,883 filed 27 Jan. 2003 for the invention of G. Fox entitled "Epicyclic Gear System" and from International Application PCT/US2004/002157 (WO 2004/067998), filed on 27 Jan. 2004, by the Timken Company.

TECHNICAL FIELD

This invention relates in general to gear systems, and more particularly to epicyclic gear systems.

BACKGROUND ART

The typical epicyclic or planetary gear system basically has a sun gear provided with external teeth, a ring gear provided with internal teeth, and several planet gears located between the sun and ring gears and having external teeth which mesh with the teeth on the sun and ring gears. In addition to its gears, the typical system has a carrier to which the planet gears are coupled. Typically the sun gear, the ring gear, or the carrier is held fast, while power is delivered to and taken from the remaining two components, and thus power is transferred through the planetary system with a change in angular velocity and an inverse change torque. However, in some epicyclic systems all three rotate.

The sun and ring gears for all intents and purposes share the same axis—a central axis—while the planet gears revolve about radially offset axes that are parallel to the central axis—or at least they should be. Often the offset axes and the central axis are not parallel, and as a consequence the planet gears skew slightly between sun and ring gears. This causes excessive wear along the teeth of the planet, sun and ring gears, generates friction and heat, and renders the entire system overly noisy.

The problem certainly exists in straddle-designed planetary carriers. With this type of carrier the pins on which the planet gears rotate extend between two carrier flanges in which the pins are anchored at their ends. The carrier experiences torsional wind up which causes one carrier flange to rotate slightly ahead of the other flange and produce a poor mesh between the planet gears and the sun and ring gears. Each pin at its ends in cross section should possess enough shear area and section modulus to withstand the shear forces and bending moments exerted on the pin by the flanges.

Another type of epicyclic gear system utilizes a single flange carrier and flexible pins anchored in and projected from the flange. In this arrangement the single carrier flange is offset axially from planet gears, and the carrier pins project from that flange into—and indeed through—the planet gears. Each carrier pin has one end anchored in the carrier flange and at its other end is fitted within a sleeve which returns back over the pin, yet is spaced radially from the pin, to support the planet gear—a double cantilever so to speak. U.S. Pat. No. 3,303,713 to R. J. Hicks shows such a double cantilevered arrangement. But the sleeves occupy space which could otherwise be utilized to enlarge the pin diameter, and when an antifriction bearing is interposed between the sleeve and the planet gear that is around the sleeve, even less space is available for the pin.

Essentially, the double cantilever, with a sleeve interposed between a planet gear and the pin about which the gear rotates, reduces the cross section of the pin and of course the shear area and section modulus. This can reduce the torque capacity of the system, so frequently more pins are added to increase the available total cross-sectional area of the pins and regain some of the lost torque capacity. Using more pins necessarily spaces the peripheries of the planetary gears closer together. Sometimes the number of pins required to achieve the required torque capacity will result in interference between the planetary gears.

BEST MODE FOR CARRYING OUT THE INVENTION

Figure 1:
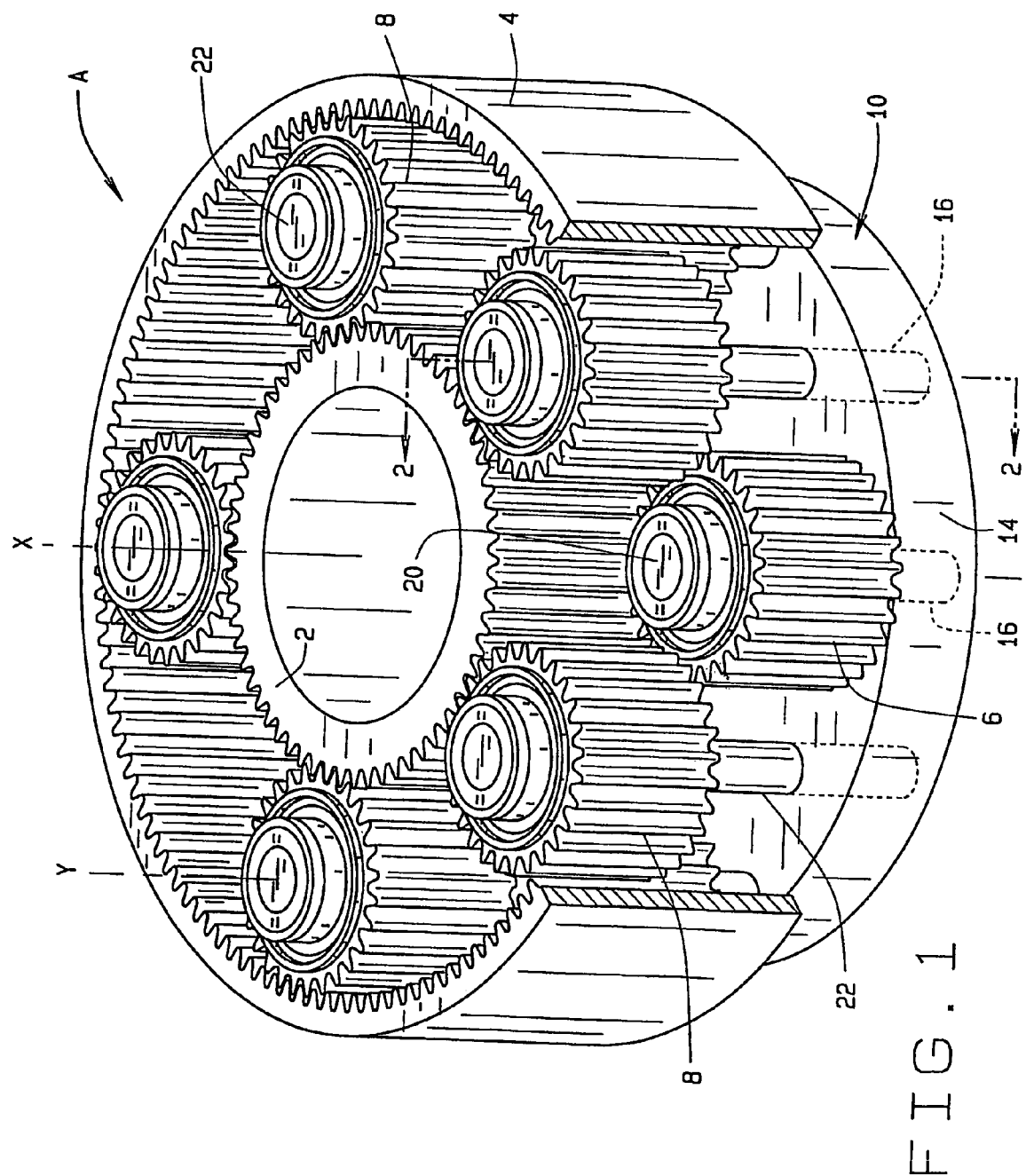
FIG. 1 is a perspective view, partially broken away and in section, of an epicyclic gear system constructed in accordance with an embodying the present invention.

Referring now to the drawings, epicyclic gear systems A and B, each of which is organized about a center axis X, have the traditional sun and ring gears together with planet gears, but the planet gears in number exceed those found in more conventional epicyclic systems, While the systems A and B occupy little space, they have the capacity to transfer torque of a relatively high magnitude. Each system has a carrier to which its planet gears are coupled through flexible pins in a double cantilever arrangement. The pins establish offset axes Y about which the planet gears rotate, and the axes Y closely parallel the center axis X, thus producing a good mesh between the planet and ring gears so as to have a good load distribution across each planet gear and a generally uniform load distribution among the several planet gears. The total cross-sectional area of the pins is high to provide the shear area and section modulus required to withstand the transfer of substantial torque.

Turning now to the epicyclic gear system A (FIG. 1), it includes a sun gear 2, a ring gear 4 located around the sun gear 2, and planet gears 6 and 8 located in two rows between the sun gear 2 and ring gear 4, with planet gears 6 occupying one row and the planet gears 8 occupying the other row. Moreover, the planet gears 6 are staggered with respect to the planet gears 8, that is to say, they are offset circumferentially. Thus, the peripheries of the gears 6 may overlap the peripheries of the gears 8 without interference between the gears 6 and 8, this by reason of the gears 6 and 8 being organized in the two rows. All the gears 2, 4, 6 and 8 have teeth, and the planet gears 6 and 8 mesh with sun gear 2 and ring gear 4 along the teeth of those gears 2, 4, 6 and 8.

In addition, the system A has a carrier 10 to which the planet gears 6 and 8 are coupled, so that the planet gears 6 and 8 do not displace axially and interfere with each other or migrate out of the annular space between the sun gear 2 and ring gear 4. The sun gear 2, ring gear 4, and carrier 10 represent components of the system A at which power may be supplied to the system A and delivered from the system A.

The carrier 10 includes (FIG. 1) a single flange 14 which lies adjacent to the row of planet gears 6, yet beyond the ends of those planet gears 6 and beyond the ends of the sun gear 2 and ring gear 4 as well. The flange 14 contains bores 16 which are arranged at equal circumferential intervals and at equal radii from the center axis X. Fitted to the bores 16 are short pins 20 and long pins 22, with the pins 20 and 22 alternating. Thus, every other bore 16 contains a short pin 20, and the remaining bores 22 contain long pins 22. The pins 20 and 22 project from the flange 14 into the annular space between the sun gear 2 and ring gear 4 in the form of a cantilevers which give the pins 20 and 22 a measure of flexibility. The gears 6 of the inner row rotate about the short pins 20, whereas the gears 8 of the outer row rotate about the long pins 22.

Figure 2:
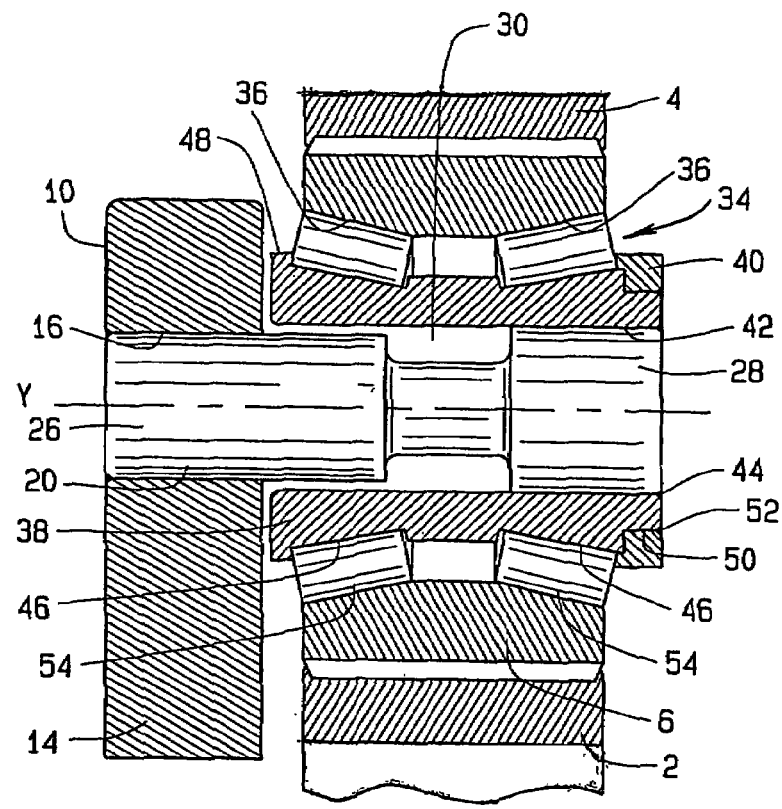
FIG. 2 is a sectional view taken along line 2-2 of FIG. 1.
Figure 3:
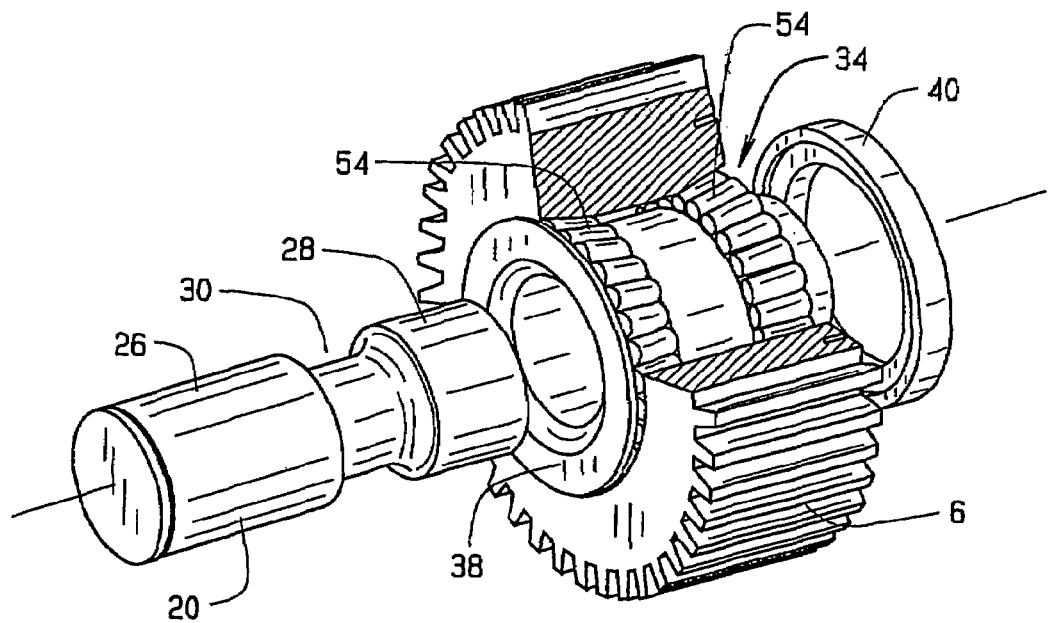
FIG. 3 is an exploded perspective view showing one of the carrier pins, the planet gear for that pin, and the bearing on which the planet gear rotates.

Each pin 20 has (FIGS. 2 & 3) a shank 26 at its fixed end where it is anchored in the flange 10 and at its free end a head 28. Between the shank 26 and head 28 the pin 20 may also have a groove 30 to enhance the flexibility of the pin 20. The shank 26 extends out of one of the bores 16 of the flange 10 and into the planet gear 6 for the pin 20. The head 28 also has a cylindrical surface of uniform diameter, and that diameter may be slightly greater than the diameter of the shank 26. While the head 28 may be somewhat shorter than the shank 26, it still is long enough to lie partially within its planet gear 6.

The planet gears 6 rotate around their respective carrier pins 20 on antifriction bearings 34 (FIGS. 2 & 3), each lying within its gear 6 and around its pin 20. Actually, each bearing 34 utilizes its planet gear 6 as its outer race, in that the gear 6, itself, has two tapered raceways 36 that are presented inwardly toward the axis Y of rotation for the gear 6 and taper downwardly toward each other. Each bearing 34 also includes (FIG. 2) an inner race in the form of a unitary race sleeve 38 and a separately formed rib ring 40 at one of the sleeve 38. The race sleeve 38 has a through bore 42, which at its one end receives the enlarged head 28 on the pin 20. An interference fit exists between the head 28 and the surface of the bore 42 in the sleeve 38, but even so, head 28 of the sleeve 38 and the head 28 are joined together along a circular weld 44. Beyond the head 28 the surface of the bore 44 is spaced from the shank 26 of the pin 20, thus creating the second cantilever. The sleeve 38 projects through the interior of the planet gear 6, and here is provided with two tapered raceways 46 which taper downwardly toward each other and are presented outwardly toward the raceways 36 in the planet gear 6. The raceway 46 toward the free end of the race sleeve 38 leads up to a thrust rib 48 which is formed as an integral part of the sleeve 38. The other raceway 46 at its large end leads into a rabbet 50 at the mounted end of the sleeve 38. The rib ring 40 fits into the rabbet 50 and is secured to the sleeve 38 at another weld 52 to provide a rib at the large end of the adjoining raceway 46.

The bearing 34 also has (FIGS. 2 & 3) tapered rollers 54 arranged in two rows between the tapered raceways 36 of the planet gear 38 and the tapered raceways 46 on the race sleeve 38. The large end faces of the rollers 54 in one row move along and are confined by the rib ring 40 on the race sleeve 38, while the large ends of the rollers 54 in the other row move along and are confined by the integral thrust rib 48. By virtue of the position in which the rib ring 40 is secured to the race sleeve, 38, the bearing 34 is in a condition of slight preload, so no clearances exist between the raceways 36 and 46 and the rollers 54. Moreover, the rollers 54 of the two rows are on apex, meaning that the conical envelopes in which their side faces lie have their apices at a common point along the axis Y for planet gear 6.

U.S. patent application Ser. No. 10/680,043 of G. Fox and E. Jallat, filed Oct. 7, 2003, and entitled "Epicyclic Gear System", describes the bearing 34 in more detail, and that application is incorporated herein by reference. The pins 22 are similar to the pins 20, except that their shanks 26 are longer. The planet gears 8 rotate on similar bearings 34 located around those pins 22.

The grooves 30 between the shanks 26 and the heads 28 of the pins 20 and 22 impart a measure of flexibility to the pins 20 at 22, but irrespective of whether the pins 20 and 22 have grooves 30, they should flex such that the axes Y of the planet gears 6 and 8 lie generally parallel to the axis X. This insures that the planet gears 6 and 8 mesh properly with the sun gear 2 and ring gear 4 and that loads are distributed evenly across the widths of the planet gears 6 and 8 and uniformly between the planet gears 6 and 8.

In the operation of the epicyclic gear system A the planet gears 6 and 8 of the two rows transfer torque and power between the sun gear 2 and ring gear 4. By reason of their increased number, the planet gears 6 and 8 individually have less width than their counterparts in more traditional epicyclic systems. Should they skew, the skewing will have less detrimental effects than had the skewing occured with wider and more conventional planet gears. Indeed, this extends the life of the planet gears 6 and 8 and their bearings 34, as well as the lives of the sun gear 2 and ring gear 4. It also enables the entire gear system A to be highly compact—all without compromising the cross sectional area of the flexible carrier pins 20 and 22. The staggered arrangement of the planet gears 6 and 8 in two rows permits more planet gears and an increase in the total cross-sectional area for the pins 20 and 22, particularly at the flange 14 of the carrier 10 where moments are greatest.

Figure 4:
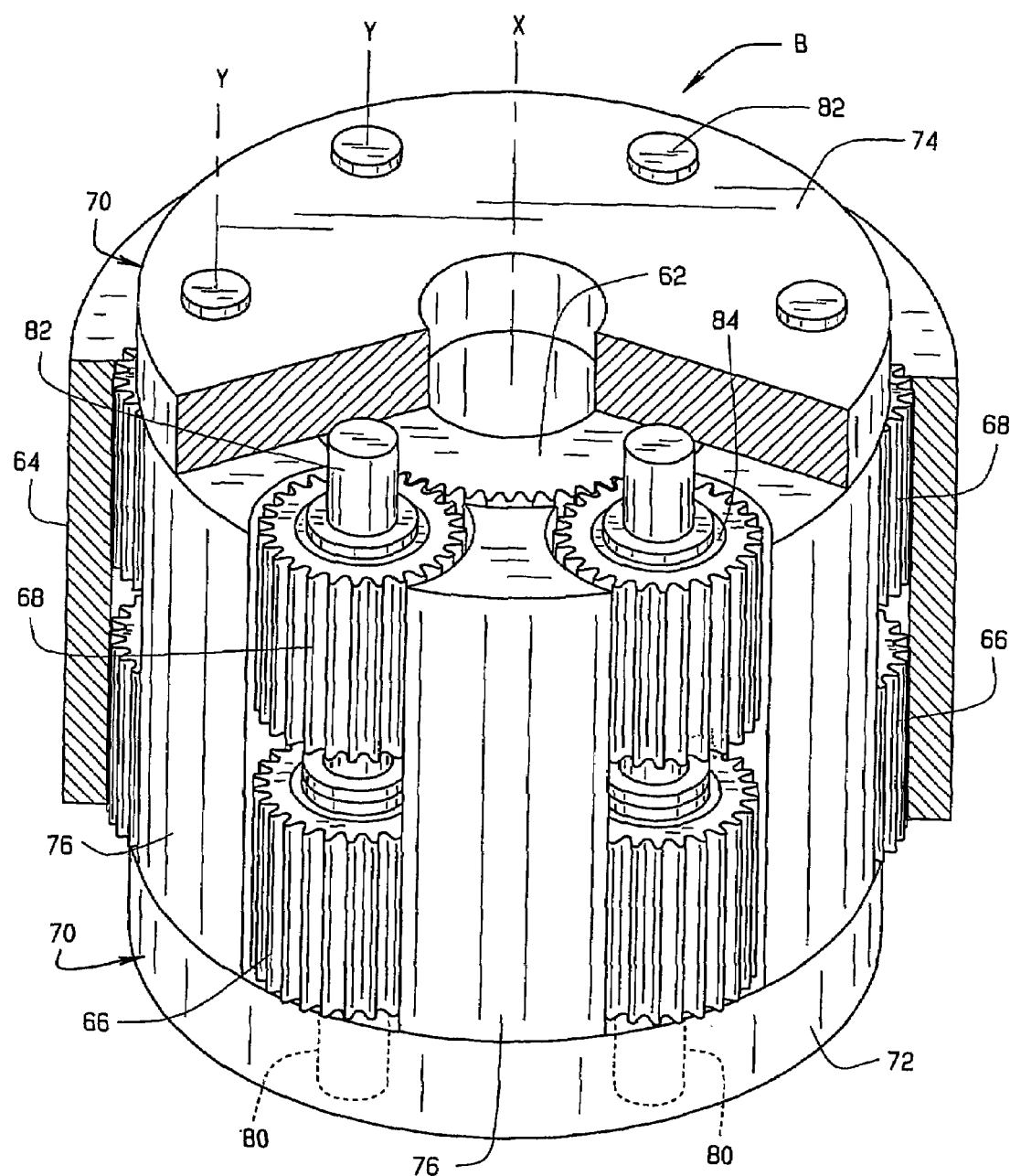
FIG. 4 is a perspective view partially broken away and in section of another epicyclic gear system constructed in accordance with and embodying the present invention.
Figure 5:
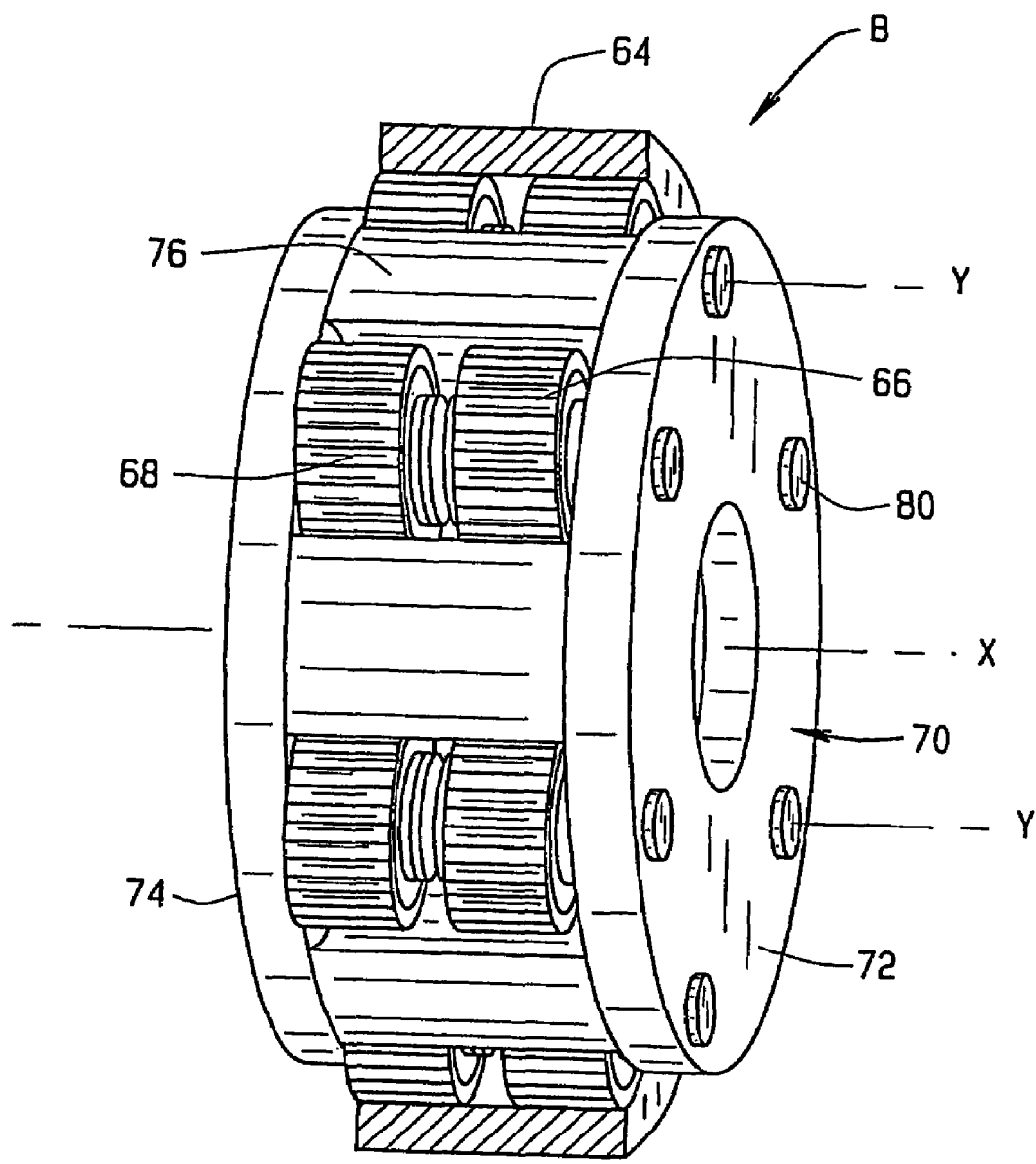
FIG. 5 is another perspective view, partially broken away and in section, of the epicyclic gear system shown in FIG. 4.

The epicyclic gear system B (FIGS. 4 & 5) likewise has a sun gear 62, a ring gear 64, and planet gears 66 and 68 located in two rows between the sun gear 62 and ring gear 64, with the gears 66 being in one row and the gears 68 being in the other row. Moreover, the planet gears 66 and 68 are coupled to a carrier 70 which defines the axes Y about which the planet gears 66 and 68 rotate.

In contrast to the carrier 10 for the epicyclic gear system A, the carrier 70 for the system B has two flanges 72 and 74, the former being adjacent to the planet gears 66 and the latter being adjacent to the planet gears 68. The two flanges 72 and 74 are connected by bridges 76 which extend between them, and in that sense the carrier 70 resembles a straddle carrier.

The gears 66 rotate around the pins 80 that are anchored in the flange 72, whereas the gears 68 rotate on pins 82 that are anchored in the flange 74. For every pin 80 that projects from the flange 72, a pin 82 projects from the flange 74, and while corresponding pins 80 and 82 align, they are not connected. Thus each pin 80 or 82 is free to flex relative to any other pin 80 or 82 including the pin 80 or 82 with which it aligns. The pins 80 and 82 resemble the short pins 20 of the carrier 10 for the planetary system A. Moreover the planetary gears 66 and 68 rotate on bearings 84 similar to the bearings 34, including race sleeves 38 which provide a double cantilever.

In the epicyclic system B, with its opposed planet gear arrangement, it is more likely that the deflection characteristics of each of flexible pins 66 and 68 can have the same torque characteristics. However, the entire epicyclical arrangement will wind up from input to output side when torque is applied to or taken from the carrier 70. So care must be taken to profile the teeth of the planetary gears 66 and 68 according to the nominal wind up at each of their design mesh points.

In both the gear systems A and B the rolling elements of the bearings 34 and 84 need not be tapered rollers, but may assume other shapes such as balls, cylindrical or spherical rollers, or needles. Indeed, the bearings need not contain rolling elements at all. Instead, each race sleeve 38 itself may function as a journal for the planet gear 6, 8, 66 or 68 that is around it. When the bearings 34 and 84 have rolling elements, the raceways 36 and 46 may be on races that are formed separately from the planet gears 6, 8, 66 and 68, on one hand, and the race sleeves 38, on the other.

The invention claimed is:

1. An epicyclic gear system comprising:
   a sun gear;
   a ring gear located around the sun gear;
   first planet gears located between and engaged with the sun and ring gears in a first row;
   second planet gears located between and engaged with the sun and ring gears in a second row, with the second gears being displaced axially from the first gears; and
   a carrier having first pins on which the first planet gears rotate and second pins on which the second planet gears rotate, the first and second pins being cantilevered from the carrier and being detached from each other.

2. A gear system according to claim 1 wherein each pin provides a double cantilevered mounting for the planet gear which rotates on it.

3. A gear system according to claim 1 wherein the carrier has a single flange and the first and second pins are anchored in and extend from the flange such that they are cantilevered from the flange.

4. A gear system according to claim 3 wherein the planet gears revolve about their respective pins on bearings, with each bearing including a race sleeve which extends through the planet gear and over the pin, the sleeve being anchored to its pin remote from the flange and being directed toward the flange and through the planet gear from where it is anchored, whereby the planet gear is mounted on the carrier through a double cantilever.

5. A gear system according to claim 4 wherein the first and second pins are organized alternately in a circular row on the flange of the carrier, and the second pins are located between the first planet gears.

6. A gear system according to claim 1, wherein the carrier has first and second flanges, with the first flange being located adjacent to the first planet gears and the second flange being located adjacent to the second planet gears; and wherein the first pins extend from the first flange and the second pins extend from the second flange.

7. A gear system according to claim 6 wherein the first and second pins are cantilevered from the first and second flanges, respectively, of the carrier; and wherein the planet gears revolve about their respective pins on bearings, with each bearing including a race sleeve which extends through the planet gear and over the pin, the sleeve being anchored to its pin remote from the flange and being directed toward the flange and through the planet gear from where it is anchored, whereby the planet gear is mounted on the carrier through a double cantilever.

8. A gear system according to claim 7 wherein each first pin aligns axially with a different second pin.

9. A gear system according to claim 8 wherein the carrier also has bridges connecting the first and second flanges.

10. An epicyclic gear system comprising:
    a sun gear;
    a ring gear located around the sun gear;
    first planet gears located in a row between the sun and ring gears and being engaged with the sun and ring gears; and
    second planet gears located in another row between the sun and ring gears and being engaged with the sun and ring gears;
    a carrier having a single flange and first and second pins anchored in and projecting from the flange, with the first pins projecting into the first planet gears so that the first gears revolve about the first pins and the second pins projecting into the second planet gears so that the second gears revolve about the second pins, the first and second pins being cantilevered from the flange of the carrier and being detached from each other.

11. A gear system according to claim 10 and wherein the planet gears revolve about their respective pins on bearings, with each bearing including a race sleeve which extends through the planet gear and over the pin, the sleeve being anchored to its pin remote from the flange and being directed toward the flange and through the planet gear from where it is anchored, whereby the planet gear is mounted on the carrier through a double cantilever.

12. A gear system according to claim 11 wherein the first and second pins alternate and the second pins extend between the first planet gears.

13. A gear system according to claim 11 wherein each bearing includes rolling elements located between the race sleeve and the planet gear that is around the race sleeve.

14. A gear system according to claim 10 wherein the second pins are longer than the first pins.

15. An epicyclic gear system comprising:
    a sun gear;
    a ring gear located around the sun gear;
    first planet gears located in a row between the sun and ring gears and being engaged with the sun and ring gears;
    second planet gears located in another row between the sun and ring gears and being engaged with the sun and ring gears; and
    a carrier having a first flange located adjacent to the first planet gears and a second flange located adjacent to the second planet gears and further having first pins cantilevered from the first flange and extended into the first gears and second pins cantilevered from the second flange and extended into the second gears, all such that the first gears rotate about the first pins and the second gears rotate about the second pins, the first and second pins being detached from each other.

16. A gear system according to claim 15 wherein the planet gears revolve about there respective pins on bearings, with each bearing including a race sleeve which extends through the planet gear and over the pin, the sleeve being anchored to its pin remote from the flange and being directed toward the flange for its pin and through the planet gear from where it is anchored, whereby the planet gear is mounted on the carrier through a double cantilever.

17. A gear system according to claim 16 wherein each bearing includes rolling elements located between its race sleeve and the planet gear that is around the race sleeve.

18. A gear system according to claim 15 wherein each first pin aligns axially with a different second pin, so the first and second planet gears are arranged in pairs.

19. A gear system according to claim 18 wherein the carrier also has bridges which connect the first and second flanges and extend between adjacent pairs of first and second planet gears.

* * * * *